May 19, 1936.　　　　C. BREER　　　　2,041,522
AUTOMOBILE
Filed Jan. 18, 1934　　　2 Sheets-Sheet 1

INVENTOR.
CARL BREER

May 19, 1936. C. BREER 2,041,522
AUTOMOBILE
Filed Jan. 18, 1934 2 Sheets-Sheet 2
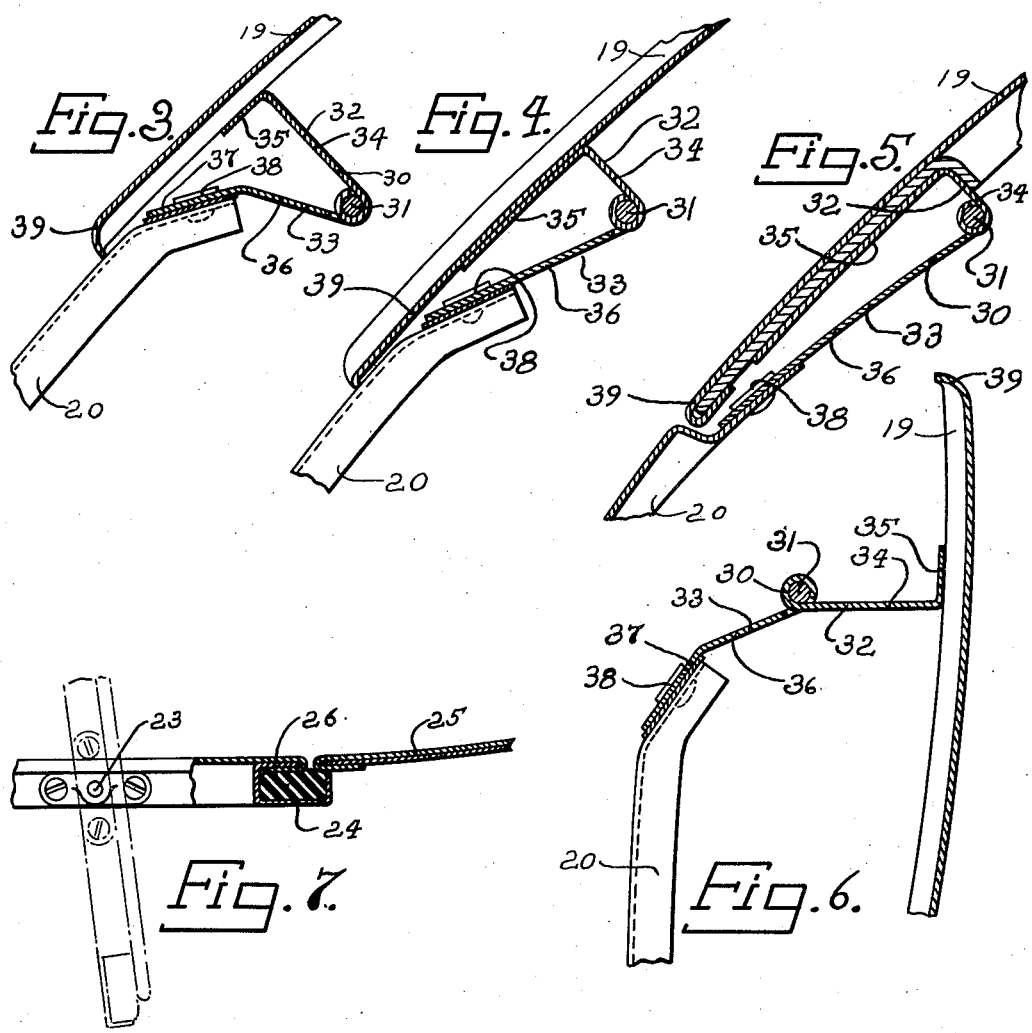
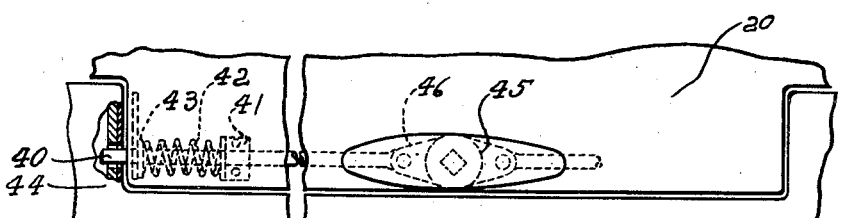
INVENTOR.
CARL BREER.
BY Harness, Lind, Pate & Hanis
ATTORNEYS.

Patented May 19, 1936

2,041,522

UNITED STATES PATENT OFFICE 2,041,522

AUTOMOBILE

Carl Breer, Detroit, Mich., assignor to Chrysler Corporation, Detroit, Mich., a corporation of Delaware Application January 18, 1934, Serial No. 707,099

8 Claims. (Cl. 180—69)

This invention relates to an improved vehicle engine compartment cover, and associated hinge and locking mechanism.

One of the main objects of the invention is to provide a cover of this character which conforms in shape with the contour required of streamline vehicle design.

Another object of the invention is to provide a two-part cover of this kind having individually formable sections, one of which is V-shaped, pivotally secured together and pivotally connected with the vehicle by concealed hinge means.

A further object of the invention is to provide an overlapping joint between the sections of the cover having a hinge which is adapted to accommodate pivotal movement of the V-shaped section relative to the other section and to provide an overlapping joint having concealed hinge means between the latter sections and the vehicle.

A still further object of the invention is to provide a cover of this kind which is mounted at its rearward section for pivotal movement about an axis extending transversely of the vehicle and which has a forward section normally disposed at an inclination to the rearward section when the cover is closed, and adapted to swing into substantially parallel, overlapping relationship to the rearward section when the cover is in open position so as to avoid obstruction of the space directly above the engine compartment.

An additional object of the invention is to provide pivotally connected top and front cover sections for a vehicle engine compartment which has permanently fixed sides formed by forward extensions of the cowl of the vehicle.

Further objects of the invention are to provide an improved hinge having a substantially straight pintle for pivotally connecting a V-shaped front engine compartment cover section and a rear cover section of different contour; to provide hinge plates having flanges inclined with respect to their connecting pintle to conform with the shape of the respective sections of the cover to which they are attached; to provide a hinge plate which is adapted to be fixed to the intermediate part of one of the sections of the cover so as to form an apron thereon which overlaps the other section; to provide hinge plates having main body portions of tapering width between the straight pintle and the V-shaped portions of the cover; to provide an improved locking mechanism for releasably holding both sections of the cover in closed positions; to provide locking mechanism of this character which is carried by the lower edge portions of the front cover section and constructed and arranged so that only a single operating handle is visible from the exterior of the vehicle; and to provide locking mechanism at one extremity of the cover and the pivotal connection of the cover with the vehicle at the other extremity so as to effectively hold all portions of the cover in firm engagement with the structure of the vehicle on which its marginal portions are received when it is in closed position.

An illustrative embodiment of the invention is shown in the accompanying drawings, in which:

Fig. 3 is a vertical sectional view taken on the line III—III of Fig. 1.

Fig. 4 is a vertical sectional view taken on the line IV—IV of Fig. 1.

Fig. 5 is a vertical sectional view taken on the line V—V of Fig. 1.

Fig. 6 is a vertical sectional view taken on the line VI—VI of Fig. 2.

Fig. 7 is a vertical sectional view taken on the line VII—VII of Fig. 1.

Fig. 8 is a fragmentary elevational view of the front end portion of the cover and associated structure of the vehicle showing the locking mechanism with which the cover is provided partially in section.

Figure 1:
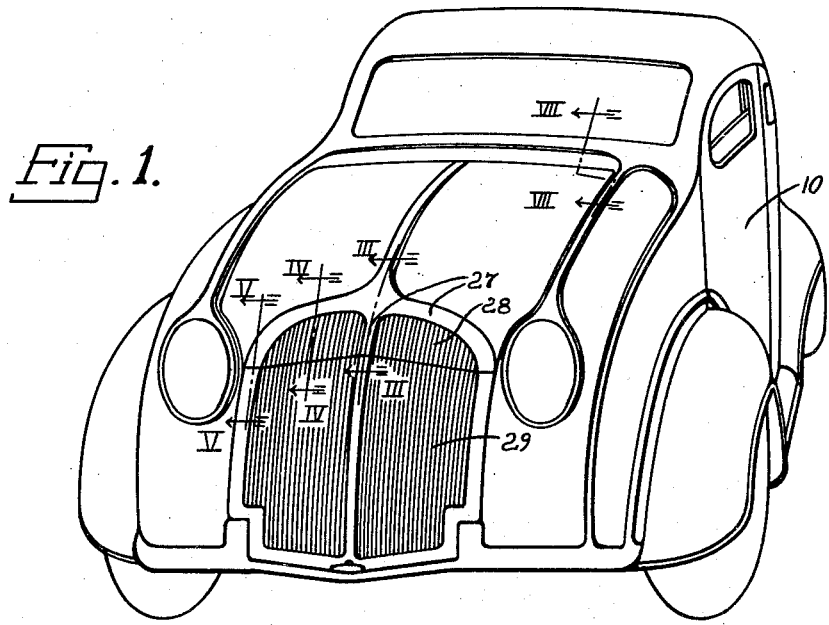
Fig. 1 is a perspective view of the front end portion of a vehicle which is equipped with my improved engine compartment cover showing the latter in closed position.
Figure 2:
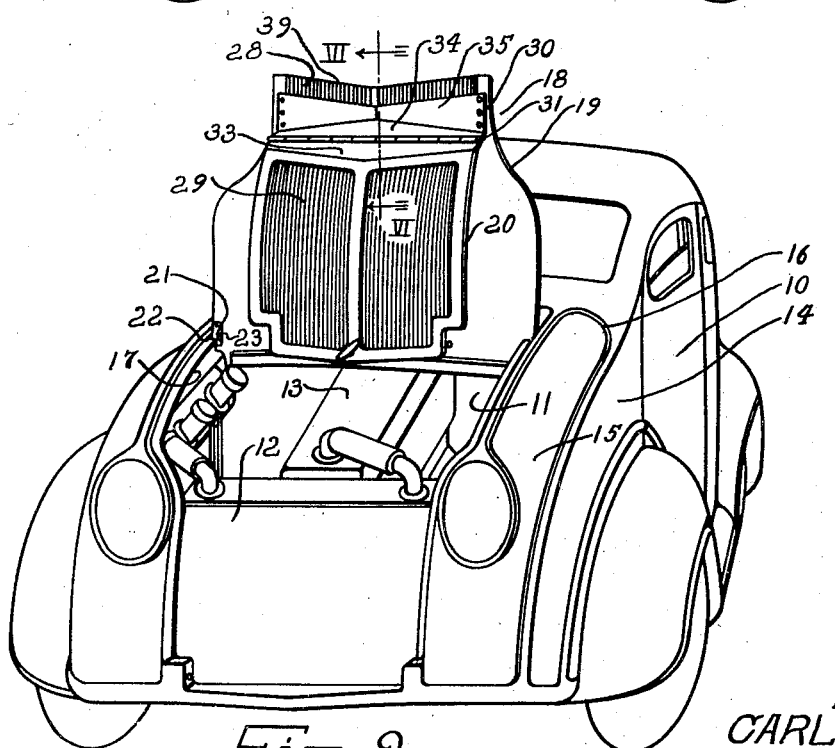
Fig. 2 is a perspective view similar to Fig. 1, but showing the cover in open position.

In the drawings, there is illustrated a vehicle having a body 10 provided with a front end portion of substantially streamline contour. The front end portion of the vehicle includes an engine compartment 11 in which is contained a radiator core 12, engine 13 and auxiliary mechanical equipment, such as that conventionally associated with a vehicle engine. The side wall portions 14 of the engine compartment and the longitudinal marginal top wall portions 15 thereof are provided by forwardly protruding extensions of the cowl 16 of the vehicle body. A continuous opening 17 extends throughout the major portions of the top and front extremities of the engine compartment.

The opening 17 is normally closed by a cover 18 comprising upper and lower cover sections 19 and 20 respectively. The upper cover section 19 is pivotally mounted on the forwardly projecting extensions of the cowl 16 by brackets 21 and 22 which are fixed to the cover and cowl respectively and which are rotatably connected together by a pin 23. The brackets 21 of the cover section 19 are located forwardly of the rear extremity of this cover section so as to enable the extension of a sheet metal channel 24 mounted on the cover section 19 slightly beneath a transversely extending cowl part 25 which is permanently fixed on the body of the vehicle. Disposed in the channel 24 is a strip of rubber 26, or other yieldable material, which is adapted to form a substantially watertight seal between the adjacent edges of the transverse cowl part 25 and the rear extremity of the cover section 19 when the cover is closed. The brackets 21 and 22 and their connecting pins 23 are preferably so constructed and arranged as to provide for pivotal movement of the cover 18 about an axis extending transversely of the vehicle. The forward end portion of the cover section 19 is disposed downwardly on an arcuate curvature and provided with embossed ribs 27 which serve to define the upper extremities of the radiator shell. This downwardly bowed forward extremity of the cover section 19 is provided with longitudinally extending slits or louvres 28 for admitting air to the interior of the engine compartment.

The forward end portions of the upper cover section 19 therefore constitute part of the radiator shell and the lower cover section 20 constitutes the remaining portion of what, in conventional vehicles, is called the radiator shell. The lower cover section 20 is provided with longitudinally extending slits or louvres 29 which register with the louvres 28 and which also serve to admit air to the interior of the engine compartment and to supply a cooling current of air through the radiator core 12. Both the forward end portion of the upper radiator section 19 and substantially the entire lower radiator cover section 20 are V-shaped in transverse cross section and these portions of the cover are pivotally connected together by a hinge 30 which has a substantially straight pintle 31 and a pair of hinge plates 32 and 33. The hinge plate 32 is provided with a substantially flat body portion 34 which tapers in width from its longitudinal central portions toward its opposite extremities to conform with the V-shaped cross section of the front end portion of the radiator cover section 19. Formed on the body portion 34 of the hinge plate 32 is an attaching flange 35. The parts of this flange on the respectively opposite sides of its longitudinal center are inclined in opposite directions with respect to the pintle 31 so as to lie substantially parallel to the converging planes of the V-shaped front end portions of the upper cover section 19 to which the flange is rigidly fixed by welding or in any other suitable manner at a location rearwardly of the forward extremity of the top cover section. The hinge plate 33 includes a body portion 36 which also tapers in width from its longitudinal central portion toward its respectively opposite ends. This hinge plate is provided at its longitudinal central portion with an angularly disposed flange 37 which extends transversely of the lower cover section 20 and gradually becomes disposed in substantially the same plane as the body portion 36 of the hinge plate 33 at locations spaced in opposite directions from the longitudinal central portion of the hinge. The flange 37 is rigidly fixed by rivets 38 or other suitable means to the upper edge portions of the lower cover section 20, as illustrated in Figs. 3 to 6, inclusive. By attaching one hinge plate to an intermediate portion of the cover section 19 and the other hinge plate to an end portion of section 20, an overlapping apron 39 is provided which effectively conceals the hinge and the junction between the two cover sections. When the engine compartment cover is rotated to an open position the front cover section 20 swings downwardly to substantially parallel relationship to the rear cover section 19, thereby preventing any obstruction of the space directly above the engine compartment.

Locking mechanism including a pair of transversely shiftable latch bolts 40, is provided on the lower edge portions of the front cover section 20. Each latch bolt 40 is slidably supported by a bracket 41 and urged outwardly from the center of the vehicle by a coil spring 42 which bears between the bracket 41 and a flange 43 formed adjacent the outer end of the latch bolt. The outer end portion of each latch bolt is receivable in an aperture 44 formed in the structure of the vehicle body adjacent the lower edge portions of the front cover section. The operating handle 45 has a shaft portion extending through and rotatably supported by the lower edge portions of the front cover section 20. Mounted on the shaft of the operating handle are diametrically opposite ears 46, each of which is pivotally connected to one of the latch bolts 40. The coil springs 42 normally hold the operating lever in transversely extended relation to the vehicle but when the handle is turned in either direction the latch bolts are drawn inwardly against the action of the springs 49 until the ends thereof are disengaged from their respective apertures so as to permit free opening movement of the cover.

Although but one specific embodiment of the invention is herein shown and described, it will be understood that various changes in the size, shape and arrangement of parts may be made without department from the spirit of my invention, and it is not my intention to limit its scope other than by the terms of the appended claims.

What I claim is:

1. An automotive vehicle body comprising a cowl having two forwardly extending side portions, a cover member adapted to close the space between said side portions comprising a main body portion hinged to said cowl, and a second body portion hinged to said main body portion.

2. In an automobile having an engine compartment, a cover for said engine compartment including an upper integral section pivotally mounted on said automobile on an axis extending transversely thereof and extending from one lateral side to the other lateral side of said engine compartment, and a lower cover section pivotally attached to said upper cover section on an axis extending transversely of said automobile and adapted to swing into substantially parallel relationship with said upper cover section when said cover is in an open position.

3. In an automobile having an engine compartment provided with substantially fixed side walls, a movable cover including an upper section providing the major portion of the top wall of said compartment, said upper cover section having a downwardly extending front portion of V-shaped transverse cross section providing a portion of the front wall of said compartment, a front cover section extending beneath the downwardly extending part of said upper cover section and conforming in shape thereto, and a hinge connecting the overlapping parts of said cover sections.

4. In an automobile having an engine compartment provided with substantially fixed side walls, a movable cover including an upper section providing the major portion of the top wall of said compartment, said upper cover section having a downwardly extending front portion of V-shaped transverse cross section providing a portion of the front wall of said compartment, a front cover section extending beneath the downwardly extending part of said upper cover section and conforming in shape thereto, and a hinge having a substantially straight pintle and including hinge plates having body portions tapering in width from their intermediate part toward each extremity thereof, one of said plates being fixed to an edge portion of said front cover section and the other hinge plate being fixed to an intermediate part of said upper cover section.

5. In an automobile having an engine compartment provided with adjoining top and front open extremities, a cover for said open extremities including an upper cover section pivotally mounted on an axis extending transversely of said automobile at a location forwardly of its rear extremity and protruding rearwardly of the open top extremity of said compartment, a front cover section underlying the forward edge portions of said upper cover section, a hinge pivotally connecting said cover sections together, and locking mechanism on the lower extremity of said front cover section extending transversely of said automobile and adapted to releasably hold both cover sections in closed positions.

6. In an automobile having an engine compartment provided with adjoining top and front open extremities, a cover for said open extremities including an upper cover section pivotally mounted on an axis extending transversely of said automobile at a location forwardly of its rear extremity and protruding rearwardly of the open top extremity of said compartment, a front cover section underlying the forward edge portions of said upper cover section, a hinge pivotally connecting said cover sections together, and locking mechanism including a pair of latch bolts shiftably mounted on the inner side of said front cover section and an operating handle protruding from the external side thereof.

7. In an automobile having an engine compartment provided with adjoining top and front open extremities, a cover for said open extremities pivotally mounted on said automobile adjacent its rear extremity, said cover comprising pivotally connected sections, laterally shiftable latch bolts mounted on the internal side of said cover adjacent its front extremity, the outer ends of said latch bolts being receivable in apertures provided in adjacent structure of said automobile, means normally yieldable urging said latch bolts outwardly, and an operating member extending outwardly from said cover and connected with said latch bolts for drawing the latter inwardly.

8. In a vehicle, a combined movable engine compartment cover and radiator shield, including a rear cover section having means thereon for pivotally mounting it on a vehicle, the front edge portions of said rear cover section being disposed downwardly and provided with longitudinally extending louvres for admitting air to the interior of said compartment, and a front cover section pivotally mounted on the downwardly disposed portions of said rear cover section and having longitudinally extending louvres registering with the louvres thereof.

CARL BREER.